United States Patent [19]

Inoue et al.

[11] Patent Number: 4,565,845

[45] Date of Patent: Jan. 21, 1986

[54] PROCESS FOR PRODUCING POLYESTER AND BLOCK COPOLYMER THEREOF

[75] Inventors: Shohei Inoue; Takuzo Aida; Koichi Sanuki; Masahide Ishikawa, all of Tokyo, Japan

[73] Assignee: Hitachi Chemical Company, Ltd., Tokyo, Japan

[21] Appl. No.: 706,181

[22] Filed: Feb. 27, 1985

[30] Foreign Application Priority Data

Sep. 5, 1984 [JP] Japan ................................ 59-185968
Sep. 5, 1984 [JP] Japan ................................ 59-185969
Sep. 5, 1984 [JP] Japan ................................ 59-185970

[51] Int. Cl.$^4$ ........................................... C08G 63/76
[52] U.S. Cl. ...................................... 525/25; 525/437; 525/438; 528/274; 528/282; 528/286; 528/297

[58] Field of Search ............... 528/282, 274, 286, 297; 525/438, 437, 25

[56] References Cited

U.S. PATENT DOCUMENTS 4,521,586  6/1985  Fujita et al. ........................ 528/297

Primary Examiner—Lucille M. Phynes
Attorney, Agent, or Firm—Antonelli, Terry & Wands

[57] ABSTRACT

Polyesters having a narrow molecular weight distribution and block copolymers having a narrow molecular weight distribution obtained from said polyesters can be produced by using a catalyst system comprising an aluminum porphyrin complex and an organic quaternary salt under mild reaction conditions.

22 Claims, No Drawings

PROCESS FOR PRODUCING POLYESTER AND BLOCK COPOLYMER THEREOF

BACKGROUND OF THE INVENTION

This invention relates to a polyester having a narrow distribution of molecular weight and a process for producing the same, and a block copolymer of said polyester having a narrow molecular weight distribution and a process for producing the same.

Generally speaking, polyesters are produced by polycondensation reaction of a polybasic acid and a polyhydric alcohol. But since this reaction is a successive reaction, it was very difficult to produce the polymer having a narrow molecular weight distribution.

On the other hand, it is also possible to produce a polyester by ring-opening polymerization of an acid anhydride and an epoxide. But it was also very difficult to produce a polyester having a narrow molecular weight distribution.

Further, in condensation polymers such as polyester, it was very difficult to directly produce polymers having a narrow molecular weight distribution as mentioned above. In order to obtain a polymer having a molecular weight distribution in a narrow range, it had to use a process such as fractionation, and the like. In addition, in the case of condensation polymers, since condensation and decomposition take place at the same time, random copolymers are easily produced, while block copolymers are not obtained in general.

SUMMARY OF THE INVENTION

It is an object of this invention to provide a process for producing a polyester having a narrow molecular weight distribution by using a catalyst system containing an aluminum porphyrin complex which was found as catalyst for producing a homopolymer of an epoxide (Die Makromolekulare Chemie., 182 (4), 1073-9 (1981)) and an organic quaternary salt, and a polyester thus produced.

It is another object of this invention to provide a process for producing a block copolymer having a narrow molecular weight distribution by using the polyester obtained as mentioned above and the same catalyst as mentioned above, and a block copolymer thus produced.

This invention provides a process for producing a polyester having a narrow molecular weight distribution which comprises reacting an acid anhydride with an epoxide using as a catalyst an aluminum prophyrin complex and an organic quaternary salt, and a polyester thus produced.

This invention also provides a process for producing a block copolymer having a narrow molecular weight distribution which comprises producing a polyester by reacting an acid anhydride with an epoxide using as catalyst an aluminum porphyrin complex and an organic quaternary salt, and reacting the polyester with an epoxide, an epoxide and an acid anhydride, or an epoxide and a carbon dioxide gas in the presence of the above-mentioned catalyst, and a block copolymer thus produced.

This invention further provides a process for producing a block copolymer having a narrow molecular weight distribution, which comprises producing a polyester by reacting an acid anhydride with an epoxide using as a catalyst an aluminum porphyrin complex and an organic quaternary salt, reacting the polyester with an epoxide, an epoxide and an acid anhydride, or an epoxide and a carbon dioxide gas in the presence of the above-mentioned catalyst, and further reacting the thus produced block copolymer with an epoxide or an epoxide and an acid anhydride in the presence of the above-mentioned catalyst, and a block copolymer thus produced.

DESCRIPTION OF THE PREFERRED EMBODIMENTS

The molecular weight distribution is defined in this invention as an ratio of weight average molecular weight ($\overline{Mw}$) to number average molecular weight ($\overline{Mn}$), i.e. $\overline{Mw}/\overline{Mn}$.

The aluminum porphyrin complex used as a component of the catalyst in this invention is obtained by reacting an organic aluminum compound with a prophine and represented by the following formula:

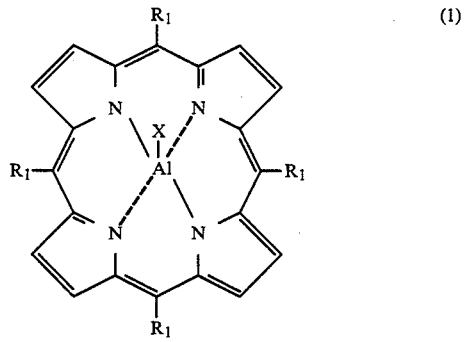

wherein X is a halogen, an alkyl group preferably having 1 to 4 carbon atoms, or an alkoxy group preferably having 1 to 5 carbon atoms; $R_1$ is hydrogen or a group of the formula:

$R_2$ is hydrogen, a halogen, an alkyl group preferably having 1 to 4 carbon atoms, or an alkoxy group preferably having 1 to 4 carbon atoms. The term "halogen" includes chlorine, fluorine, iodine and bromine.

Examples of the aluminum porphyrin complex are tetraphenylprophinatoaluminum chloride, tetraphenylprophinatoaluminum methoxide, tetraphenylprophinatoaluminum methyl, etc.

The aluminum porphyrin complex of the formula (1) is a known compound obtained by reacting, for example, a porphine with an about equimolar amount of organic aluminum compound in the presence of a solvent in an inert gas atmosphere at about room temperature.

As the porphine, there can be used porphine or a tetraphenylporphine substituted or non-substituted at individual phenyl groups. Examples of the substituents are halogen such as chlorine, bromine, etc., an alkyl group preferably having 1 to 4 carbon atoms such as methyl, ethyl, etc., and an alkoxy group preferably having 1 to 4 carbon atoms such as methoxy, ethoxy, etc.

Porphine or a tetraphenylporphine substituted or non-substituted at individual phenyl groups can be produced from, for example, benzaldehyde and pyrrole, or a substituted benzaldehyde having the corresponding substituents and pyrrole by a conventional method.

As the organic aluminum compound, there can be used dialkylaluminum halides such as diethylaluminum chloride, diethylaluminum bromide, etc.; dialkylaluminum alkoxides such as diethylaluminum methoxide, diethylaluminum ethoxide, etc.

As the solvent, there can be used hydrocarbons such as benzene, toluene, xylenes, etc.; halogenated hydrocarbons such as methylene chloride, chloroform, dichloroethane, etc. The amount of the solvent can be selected properly.

As the organic quaternary salt used as a component of the catalyst together with the aluminum porphyrin complex, there can be used phosphonium salts such as ethyltriphenylphosphonium bromide, ethyltriphenylphosphonium iodide, etc.; ammonium salts such as tetraethylammonium chloride, tetraethylammonium bromide, tetraethylammonium acetate, etc. Among them, the use of ethyltriphenylphosphonium bromide is particularly preferable.

Examples of the acid anhydride are phthalic anhydride, tetrahydrophthalic anhydride, tetrabromophthalic anhydride, maleic anhydride, etc. These acid anhydrides can be used alone or as a mixture thereof.

Examples of the epoxide are aliphatic alkylene oxides having a terminal three-membered epoxy group such as ethylene oxide, propylene oxide, 1-butylene oxide, epichlorohydrin, etc.; alicyclic alkylene oxides having a three-membered epoxy group such as cyclohexene oxide, cyclopentene oxide, etc.; aromatic alkylene oxides having a three-membered epoxy group such as styrene oxide, phenyl glycidyl ether, etc. These epoxides can be used alone or as a mixture thereof.

The production of polyester can be carried out in the presence of a solvent or in the absence of a solvent by adding the aluminum porphyrin complex of the formula (1) and the organic quaternary salt to an acid anhydride and an epoxide preferably in an atmosphere of an inert gas.

It is preferable to use nitrogen as the inert gas.

As the solvent, there can be used methylene chloride, chloroform, dichloroethane, benzene, toluene, dioxane, tetrahydrofuran, etc. Among them, the use of a halogenated hydrocarbon is preferable.

The reaction can sufficiently proceed at room temperature. It is also possible to carry out the reaction with heating preferably at upto 80° C.

There is no particular limit to the ratio of the acid anhydride to the epoxide, but it is preferable to use the acid anhydride and the epoxide in equimolar amounts.

There is also no particular limit to the ratio of the aluminum porphyrin complex of the formula (1) to the organic quaternary salt. The organic quaternary salt is usually used in an amount of 1/10 to 10 moles per mole of the aluminum porphyrin complex of the formula (1), and preferably about 1 mole of the former per mole of the latter.

There is no particular limit to the ratio of the epoxide to the aluminum porphyrin complex of the formula (1), but it is preferable to use the epoxide in an amount of 10 to 1000 moles per mole of the aluminum porphyrin complex.

The polyester thus obtained has a narrow molecular weight distribution ($\overline{Mw}/\overline{Mn}$) of 1.0 to 1.5, and preferably 1.0 to 1.2 when properly selecting conditions. Since the thus produced polyester has a narrow molecular weight distribution, it can advantageously be used for producing a block copolymer having a narrow molecular weight distribution as explained below.

The block copolymer having a narrow molecular weight distribution can be produced by reacting the thus produced polyester with an epoxide, an epoxide and an acid anhydride, or an epoxide and carbon dioxide gas in the presence of the above-mentioned catalyst system.

As the epoxide, there can be used the epoxides mentioned above alone or as a mixture thereof.

The reaction of an epoxide with the polyester can be carried out by adding the epoxide to the reaction system containing the polyester and the aluminum porphyrin complex and the organic quaternary salt. The reaction can proceed sufficiently at room temperature, and if necessary with heating upto about 80° C.

There is no particular limit to the ratio of the epoxide to the aluminum porphyrin complex, but it is preferable to use the epoxide in an amount of 10 to 1000 moles per mole of the aluminum porphyrin complex.

In the case of reacting the polyester with an epoxide and an acid anhydride, there can be used the same epoxides and acid anhydrides as mentioned above, alone or as a mixture thereof, respectively.

There is no particular limit to the ratio of the acid anhydride to the epoxide to be reacted with the polyester, but it is preferable to use the two in equimolar amounts.

The reaction of the polyester with an epoxide and an acid anhydride can be carried out by adding the epoxide and the acid anhydride to the reaction system containing the polyester and the aluminum porphyrin complex and the organic quaternary salt. The reaction can proceed sufficiently at room temperature, and if necessary with heating upto about 80° C.

In the case of reacting the polyester with an epoxide and carbon dioxide gas, there can be used the same epoxides as mentioned above alone or as a mixture thereof.

There is no particular limit to the amount of epoxide, but it is preferable to use the epoxide in an amount of 10 to 1000 moles per mole of the aluminum porphyrin complex.

The reaction of the polyester with an epoxide and carbon dioxide can be carried out by adding the epoxide to the reaction system containing the polyester and the aluminum porphyrin complex and the organic quaternary salt, followed by blowing of the carbon dioxide gas thereinto. The reaction system is pressured with carbon dioxide gas and preferably maintained under a pressure of 30 to 50 atmospheres. The reaction can proceed sufficiently at room temperature, and if necessary with heating upto about 50° C.

The block copolymer thus obtained has a narrow molecular weight distribution ($\overline{Mw}/\overline{Mn}$) of 1.0 to 1.5, and preferably 1.0 to 1.2 when properly selecting conditions.

The block copolymer thus obtained having a narrow molecular weight distribution can further be reacted with an epoxide, or an epoxide and an acid anhydride in the presence of the aluminum porphyrin complex and the organic quaternary salt to give a multiple block copolymer. As the epoxide and the acid anhydride, there can be used those mentioned above, alone or as a mixture thereof, respectively. The acid anhydride is not always used depending on purposes.

The ratio of the acid anhydride to the epoxide is not particularly limited, but it is preferable to use the two in equimolar amounts.

The reaction can proceed sufficiently at room temperature, and if necessary with heating preferably upto about 50° C, preferably under an atmosphere of inert gas. As the inert gas, it is preferable to use nitrogen.

If necessary, a solvent may be added to the reaction system. Examples of the solvent are methylene chloride, chloroform, dichloroethane, benzene, toluene, dioxane, tetrahydrofuran, etc. The use of a halogenated hydrocarbon is particularly preferable.

The amount of the epoxide is not particularly limited, but it is preferable to use the epoxide in an amount of 10 to 1000 moles per mole of the aluminum porphyrin complex.

The reaction of the block copolymer having a narrow molecular weight distribution with an epoxide, or an epoxide and an acid anhydride can be carried out by adding the epoxide, or the epoxide and the acid anhydride to the reaction system containing the block copolymer and the aluminum porphyrin complex and the organic quaternary salt.

The resulting multiple block copolymer also has a narrow molecular weight distribution ($\overline{M}w/\overline{M}n$) of 1.0 to 1.5, and preferably 1.0 to 1.2 when properly selecting conditions.

Since the thus produced block copolymer or multiple block copolymer has a molecular weight distribution in a limited range compared with known materials, it shows specially limited ranges in solubity, softening point and glass transition temperature, so that clear changes in these properties can be obtained with a slight change of conditions, which results in having properties excellent in processability and handling. The block copolymer or multiple block copolymer can effectively be used as standard substances for analyses, coating compositions, adhesives, toners for electrophotography, molding materials, etc.

This invention is illustrated by way of the following Examples.

REFERENCE EXAMPLE 1

Production of Aluminum Porphyrin Complex

In a 4-liter flask equipped with a cooling tube, 80 ml (84.8 g) of benzaldehyde, 56 ml (53.6 g) of pyrrol, and 3 liters of propionic acid were placed and reacted for 30 minutes under reflux. Then, the flask was allowed to stand for one day. After filtering the reaction mixture, recrystallization from a mixed solvent of methanol and chloroform (1:1 by weight) was carried out for purification. Thus, $\alpha,\beta,\gamma,\delta$-tetraphenylporphine was obtained in 20% yield.

The $\alpha,\beta,\gamma,\delta$-tetraphenylporphine in an amount of 0.61 g was reacted with 0.12 g of diethylaluminum chloride in 20 ml of methylene chloride as a solvent at room temperature under a nitrogen atmosphere for 60 minutes to give 20 ml of a catalyst solution containing 0.68 g of aluminum porphyrin complex (I) ($\alpha,\beta,\gamma,\delta$-tetraphenylporphinatoaluminum chloride).

EXAMPLES 1 to 8

Using phthalic anhydride as the acid anhydride and various epoxides as listed in Table 1 in equimolar amounts, and the aluminum porphyrin complex (I) obtained in Reference Example 1 and ethyltriphenylphosphonium bromide (II) in a methylene chloride solution (the molar ratio of (I)/(II)=1:1, the amount of (I) being 4% by mole per mole of the acid anhydride), the reaction was carried out at room temperature with stirring under a nitrogen atmosphere.

After the polymerization, the polymers thus produced were dissolved in chloroform, and dropped in a large amount of methanol to give polyesters. The number average molecular weight, and the molecular weight distribution of the polyesters are listed in Table 1.

As is clear from Table 1, the molecular weight distribution is in the range of 1.08 to 1.17, which values are close to 1. This means that the polyesters obtained have uniform molecular weights.

The molecular weight was measured by GPC using 4 columns filled with polystyrene gel (Column mix-mix-3000-2000, mfd. by Toyo Soda Manufacturing Co., Ltd.) and tetrahydrofuran as a solvent at a column temperature of 38° C. The molecular weight was calculated by using GPC spectra obtained compared with GPC spectra of standard polystyrene.

TABLE 1

| Example No. | Epoxide | Reaction time (days) | Average molecular weight (Mn) | Molecular weight distribution (Mw/Mn) |
|---|---|---|---|---|
| 1 | Ethylene oxide | 4 | 1700 | 1.16 |
| 2 | Propylene oxide | 4 | 2500 | 1.09 |
| 3 | 1-Butylene oxide | 12 | 2800 | 1.11 |
| 4 | cis-2-Butylene oxide | 16 | 2400 | 1.11 |
| 5 | trans-2-Butylene oxide | 16 | 2700 | 1.09 |
| 6 | Styrene oxide | 13 | 2100 | 1.14 |
| 7 | Phenyl glycidyl ether | 6 | 3000 | 1.08 |
| 8 | Cyclohexene oxide | 13 | 3400 | 1.17 |

EXAMPLES 9 to 12

After dissolving 25 mmole of phthalic anhydride and 25 mmole of an epoxide (1) as listed in Table 2 in 5 ml of methylene chloride, 20 ml of methylene chloride solution containing 1 mmole of the aluminum porphyrin complex (I) obtained in Reference Example 1 and 1 mmole of ethyltriphenylphosphonium bromide was added thereto. The reaction was carried out at room temperature with stirring under a nitrogen atmosphere to give a polyester (1) (perpolymer) shown in Table 2.

The molecular weight and the molecular weight distribution of the resulting polyesters are as shown in Table 2.

The methylene chloride solution containing the polyester (1) was added to 5 ml of methylene chloride solution dissolving 25 mmole of phthalic anhydride and 25 mmole of an epoxide (2) listed in Table 2. The reaction was carried out with stirring at room temperature under a nitrogen atmosphere to give a block copolymer.

After the reaction, the reaction product was dissolved in chloroform, dropped in a large amount of methanol and reprecipitated. Precipitation by using chloroform and methanol was repeated to purify the polymer.

The thus obtained polymer was a block copolymer (1) of polyester-b-polyester and had the molecular weight and the molecular weight distribution as listed in Table 2.

As is clear from Table 2, the block polymers (1) have the molecular weight distribution of 1.08 to 1.19, which values are close to 1. This means that the block copolymers obtained have uniform molecular weights.

TABLE 2

| Example No. | Polyester (1) | | Epoxide (2) | Block copolymer (1) | |
|---|---|---|---|---|---|
| | Epoxide (1) | Average molecular weight (Mn) | Mol. wt. distribution (Mw/Mn) | | Average molecular weight (Mn) | Mol. wt. distribution (Mw/Mn) |
| 9 | Propylene oxide | 2400 | 1.12 | Ethylene oxide | 3300 | 1.18 |
| 10 | Propylene oxide | 2500 | 1.11 | Propylene oxide | 4200 | 1.19 |
| 11 | Propylene oxide | 2500 | 1.09 | 1-Butylene oxide | 4600 | 1.17 |
| 12 | 1-Butylene oxide | 2600 | 1.10 | Propylene oxide | 4600 | 1.08 |

EXAMPLE 13

After dissolving 25 mmole of phthalic anhydride and 25 mmole of propylene oxide in 5 ml of methylene chloride, 20 ml of a methylene chloride solution containing 1 mmole of the aluminum porphyrin complex (I) synthesized in Reference Example 1 and 1 mmole of ethyltriphenylphosphonium bromide was added thereto, and the reaction was carried out with stirring at room temperature under a nitrogen atmosphere for 168 hours. After the reaction, the polyester (2) obtained had an average molecular weight ($\overline{Mn}$) of 2100 and a molecular weight distribution ($\overline{Mw}/\overline{Mn}$) of 1.15. Then, to this reaction system, 100 mmole of propylene oxide was added and the reaction was carried out at room temperature with stirring under a nitrogen atmosphere for 168 hours.

Then, unreacted epoxide and the solvent was removed by distillation under reduced pressure to give a block copolymer (2) of polyester-b-polyether. The block copolymer (2) had an average molecular weight ($\overline{Mn}$) of 3100 and a molecular weight distribution ($\overline{Mw}/\overline{Mn}$) of 1.10.

Subsequently, the block copolymer (2) was dissolved in methylene chloride, followed by addition of 5 ml of methylene chloride containing 25 mmole of phthalic anhydride and 25 mmole of propylene oxide. The reaction was carried out with stirring at room temperature under a nitrogen atmosphere for 168 hours.

As a result, a block copolymer (3) of polyester-b-polyether-b-polyester was obtained. The block copolymer (3) had an average molecular weight ($\overline{Mn}$) of 4900 and a molecular weight distribution ($\overline{Mw}/\overline{Mn}$) of 1.12.

EXAMPLES 14 to 21

After dissolving 25 mmole of phthalic anhydride and 25 mmole of propylene oxide in 5 ml of methylene chloride, 20 ml of a methylene chloride solution containing 1 mmole of the aluminum porphyrin complex (I) synthesized in Reference Example 1 and 1 mmole of ethyltriphenylphosphonium bromide was added thereto, and the reaction was carried out with stirring at room temperature for 120 hours to give a polyester (3).

The polyester (3) (prepolymer) thus obtained was placed in a 100-ml autoclave made of stainless steel, wherein the air had been replaced by nitrogen, and the nitrogen was replaced by carbon dioxide. Then, 113 moles of epoxide (3) as shown in Table 3 per mole of aluminum porphyrin complex (1) was added and the reaction was carried out under a carbon dioxide pressure of 50 atmosphere at room temperature with stirring for 336 hours.

Then, excess carbon dioxide was removed from the reaction system to give a block copolymer (4) of polyester-b-polycarbonate as shown in Table 3.

Then, 35 moles of a mixture of phthalic anhydride and propylene oxide per mole of the polyester (3) was added to the polyester (3) to carry out a further reaction with stirring at room temperature for 168 hours.

The final product is a block copolymer (5) of polyester-b-polycarbonate-b-polyester. The block copolymers (5) have molecular weights ($\overline{Mn}$) and molecular weight distributions ($\overline{Mw}/\overline{Mn}$) as shown in Table 3.

As mentioned above, polyesters having a narrow molecular weight distribution and block copolymers having a narrow molecular weight distribution by using said polyesters can be obtained at room termperature under mild conditions according to the process of this invention.

TABLE 3

| Example No. | Polyester (3) | | Epoxide (3) | Block copolymer (4) | | Block copolymer (5) | |
|---|---|---|---|---|---|---|---|
| | Av.mol. wt. (Mn) | Mol. wt. distribution (Mw/Mn) | | Av. mol. wt. (Mn) | Mol. wt. distribution (Mw/Mn) | Av. mol. wt. (Mn) | Mol. wt. distribution (Mw/Mn) |
| 14 | 2600 | 1.12 | Ethylene oxide | 4400 | 1.10 | 5700 | 1.14 |
| 15 | 2300 | 1.13 | Propylene oxide | 5900 | 1.11 | 8000 | 1.19 |
| 16 | 2600 | 1.12 | 1-Butylene oxide | 3800 | 1.12 | 5400 | 1.12 |
| 17 | 2500 | 1.09 | Cyclohexene oxide | 6800 | 1.11 | 8500 | 1.15 |
| 18 | 2500 | 1.09 | Phenyl glycidyl ether | 5600 | 1.12 | 8400 | 1.12 |
| 19 | 2500 | 1.09 | Styrene oxide | 3500 | 1.10 | 5700 | 1.12 |
| 20 | 2500 | 1.09 | cis-2-Butylene oxide | 2900 | 1.07 | 4800 | 1.10 |
| 21 | 2500 | 1.09 | trans-2-Butylene oxide | 3500 | 1.08 | 5700 | 1.10 |

What is claimed is:

1. A process for producing a polyester which comprises reacting an acid anhydride with an epoxide using as catalyst an aluminum porphyrin complex and an organic quaternary salt.

2. A process according to claim 1, wherein the aluminum porphyrin complex is represented by the formula:

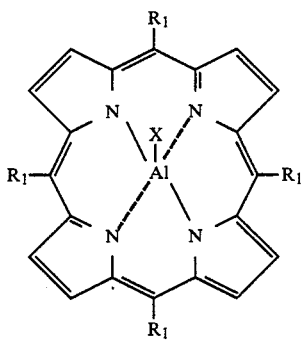

wherein X is a halogen, an alkyl group, or an alkoxy group; R₁ is hydrogen or a group of the formula:

R₂ is hydrogen, a halogen, an alkyl group or an alkoxy group.

3. A process according to claim 1, wherein the aluminum porphyrin complex is tetraphenylporphinatoaluminum chloride.

4. A process according to claim 1, wherein the organic quaternary salt is a quaternary phosphonium salt or a quaternary ammonium salt.

5. A process according to claim 4, wherein the quaternary phosphonium salt is ethyltriphenylphosphonium bromide.

6. A process for producing a block copolymer which comprises reacting an acid anhydride with an epoxide using as catalyst an aluminum prophyrin complex and an organic quaternary salt to produce a polyester, and reacting the polyester with an epoxide, an epoxide and an acid anhydride, or an epoxide and a carbon dioxide gas in the presence of the above-mentioned catalyst.

7. A process according to claim 6, wherein the polyester is reacted with an epoxide and an acid anhydride in the presence of an aluminum porphyrin complex and an organic quaternary salt.

8. A process according to claim 7, wherein the aluminum porphyrin complex is represented by the formula:

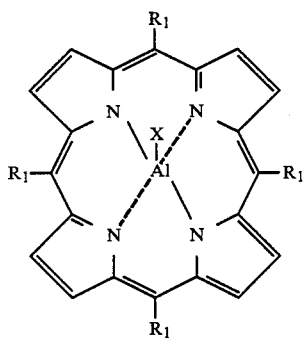

wherein X is a halogen, an alkyl group, or an alkoxy group; R₁ is hydrogen or a group of the formula:

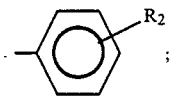

R₂ is hydrogen, a halogen, an alkyl group or an alkoxy group.

9. A process according to claim 7, wherein the aluminum porphyrin complex is tetraphenylporphinatoaluminum chloride.

10. A process according to claim 7, wherein the organic quaternary salt is a quaternary phosphonium salt or a quaternary ammonium salt.

11. A process according to claim 10, wherein the quaternary phosphonium salt is ethyltriphenylphosphonium bromide.

12. A process according to claim 6, wherein the polyester is reacted with an epoxide and a carbon dioxide gas in the presence of an aluminum porphyrin complex and an organic quaternary salt.

13. A process according to claim 12, wherein the aluminum porphyrin complex is represented by the formula:

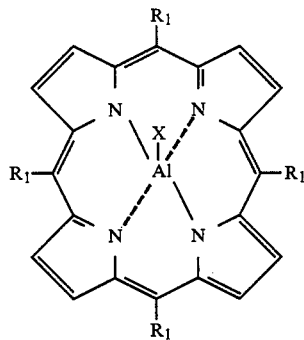

wherein X is a halogen, an alkyl group, or an alkoxy group; R₁ is hydrogen or a group of the formula:

R₂ is hydrogen, a halogen, an alkyl group or an alkoxy group.

14. A process according to claim 12, wherein the aluminum porphyrin complex is tetraphenylporphinatoaluminum chloride.

15. A process according to claim 12, wherein the organic quaternary salt is a quaternary phosphonium salt or a quaternary ammonium salt.

16. A process according to claim 15, wherein the quaternary phosphonium salt is ethyltriphenylphosphonium bromide.

17. A process according to claim 7, which further comprises reacting the block copolymer produced with an epoxide or an epoxide and an acid anhydride in the presence of the same catalyst system used in claim 7.

18. A process according to claim 12, which further comprises reacting the block copolymer produced with an epoxide or an epoxide and an acid anhydride in the presence of the same catalyst system used in claim 12.

19. A polyester having a molecular weight distribution of 1.0 to 1.5 produced by the process of claim 1.

20. A block copolymer having a molecular weight distribution of 1.0 to 1.5 produced by the process of claim 6.

21. A block copolymer having a molecular weight distribution of 1.0 to 1.5 produced by the process of claim 17.

22. A block copolymer having a molecular weight distribution of 1.0 to 1.5 produced by the process of claim 18.

* * * * *